(12) United States Patent
Isozu et al.

(10) Patent No.: US 9,122,680 B2
(45) Date of Patent: Sep. 1, 2015

(54) INFORMATION PROCESSING APPARATUS, INFORMATION PROCESSING METHOD, AND PROGRAM

(75) Inventors: Masaaki Isozu, Tokyo (JP); Tsugutomo Enami, Saitama (JP)

(73) Assignee: Sony Corporation, Tokyo (JP)

(*) Notice: Subject to any disclaimer, the term of this patent is extended or adjusted under 35 U.S.C. 154(b) by 769 days.

(21) Appl. No.: 12/880,598

(22) Filed: Sep. 13, 2010

(65) Prior Publication Data
US 2011/0099003 A1 Apr. 28, 2011

(30) Foreign Application Priority Data

Oct. 28, 2009 (JP) ................................ P2009-247755

(51) Int. Cl.
*G06F 17/27* (2006.01)
*G06F 17/30* (2006.01)

(52) U.S. Cl.
CPC .... G06F 17/30011 (2013.01); G06F 17/30622 (2013.01); G06F 17/30707 (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .............. 704/1, 9, 10; 707/706–708; 715/254
See application file for complete search history.

(56) References Cited

U.S. PATENT DOCUMENTS

| | | | | |
|---|---|---|---|---|
| 5,943,669 | A * | 8/1999 | Numata | 1/1 |
| 7,877,388 | B1 * | 1/2011 | Lamping et al. | 707/737 |
| 8,275,661 | B1 * | 9/2012 | Ponte et al. | 705/14.54 |
| 2002/0091975 | A1 * | 7/2002 | Redlich et al. | 714/699 |
| 2002/0138529 | A1 * | 9/2002 | Yang-Stephens et al. | 707/530 |
| 2004/0093557 | A1 * | 5/2004 | Kawatani | 715/500 |
| 2005/0108001 | A1 * | 5/2005 | Aarskog | 704/10 |
| 2005/0234893 | A1 * | 10/2005 | Hirsch | 707/3 |
| 2005/0246333 | A1 * | 11/2005 | Hou et al. | 707/5 |
| 2005/0289128 | A1 * | 12/2005 | Hamaguchi | 707/3 |

(Continued)

FOREIGN PATENT DOCUMENTS

JP 2008-077252 4/2008

OTHER PUBLICATIONS

Zhang et al., An improved TF-IDF approach for text classification, 2005, Journal of Zhejiang University Science, 6A(1), pp. 49-55.*

*Primary Examiner* — Lamont Spooner
(74) *Attorney, Agent, or Firm* — Sherr & Jiang, PLLC

(57) ABSTRACT

An information processing apparatus includes a category classifying unit configured to classify a document into one or more categories, a word extracting unit configured to extract one or more words from the document, a word score calculating unit configured to calculate a word score for each of the one or more words extracted from the document on the basis of an appearance frequency of the word in each of the one or more categories, the word score serving as an index of interest of the word, a sentence-for-computation extracting unit configured to extract one or more sentences from the document, and a sentence score calculating unit configured to calculate a sentence score for each of the extracted one or more sentences on the basis of the word score calculated by the word score calculating unit, the sentence score serving as an index of interest of the sentence.

20 Claims, 18 Drawing Sheets

(56) References Cited

U.S. PATENT DOCUMENTS

| | | |
|---|---|---|
| 2006/0069678 A1* | 3/2006 | Chou et al. ............... 707/5 |
| 2006/0253274 A1* | 11/2006 | Miller ............... 704/9 |
| 2006/0271527 A1* | 11/2006 | Kutsumi et al. ............... 707/3 |
| 2007/0038625 A1* | 2/2007 | Yang-Stephens et al. ............... 707/6 |
| 2007/0067293 A1* | 3/2007 | Yu ............... 707/7 |
| 2007/0143101 A1* | 6/2007 | Goutte ............... 704/9 |
| 2007/0208719 A1* | 9/2007 | Tran ............... 707/3 |
| 2008/0104506 A1* | 5/2008 | Farzindar ............... 715/254 |
| 2008/0126319 A1* | 5/2008 | Bukai et al. ............... 707/3 |
| 2009/0119284 A1* | 5/2009 | Chen et al. ............... 707/5 |
| 2009/0319518 A1* | 12/2009 | Koudas et al. ............... 707/5 |
| 2010/0023311 A1* | 1/2010 | Subrahmanian et al. ............... 704/2 |
| 2010/0049684 A1* | 2/2010 | Adriaansen et al. ............... 706/46 |
| 2010/0082333 A1* | 4/2010 | Al-Shammari ............... 704/10 |
| 2010/0153365 A1* | 6/2010 | Shemtov et al. ............... 707/722 |
| 2010/0191748 A1* | 7/2010 | Martin et al. ............... 707/750 |
| 2011/0078159 A1* | 3/2011 | Li et al. ............... 707/749 |
| 2011/0184729 A1* | 7/2011 | Nam ............... 704/9 |
| 2013/0041921 A1* | 2/2013 | Cooper et al. ............... 707/780 |

* cited by examiner

FIG. 8A

| DOCUMENT X |

Singer x graduated from AA high school in 2000.
She made her debut as a singer with "CC" produced by B.
In 2002, she made her first appearance in RW song
festival and sang "DD". In 2003, she held EE party to
commemorate the release of her photo collection.
In 2005, she acted as an image character of FF group.

FIG. 8B

| DOCUMENT Y |

Actress y is a Japanese actress from Tokyo.
Her father is GG, who was a member of Japan's national
team of soccer. She graduated from HH University
of music and made her debut as an actress in 2001.
In 2004, she won the new actress award in the Japan
Academy Awards. In 2005, she played the heroine, JJ,
in cinema II and created a sensation. She is also famous
as a pianist, and played KK concerto in a concert in 2006.

FIG. 8C

| DOCUMENT Z |

Athlete z is from Hokkaido and belongs to LL team.
He was selected as a member of Japan's national team
for the first time in 2001, and has been extending
his record of consecutive appearances since then.
In 2003, he made his debut as a singer.
In 2004, he appeared in three TV commercials.

FIG. 10A

| CATEGORY | SINGER |
|---|---|
| DOCUMENT X | DOCUMENT Z |

FIG. 10B

| CATEGORY | PIANIST |
|---|---|
| DOCUMENT Y | |

FIG. 10C

| CATEGORY | ACTOR/ACTRESS |
|---|---|
| DOCUMENT Y | |

FIG. 10D

| CATEGORY | ATHLETE |
|---|---|
| DOCUMENT Z | |

FIG. 11A

DOCUMENT X

Singer x graduated from AA high school in 2000.
She made her debut as a singer with "CC" produced by B.
In 2002, she made her first appearance in RW song
festival and sang "DD". In 2003, she held EE party to
commemorate the release of her photo collection.
In 2005, she acted as an image character of FF group.

| Category | Singer |
|---|---|

FIG. 11B

DOCUMENT Y

Actress y is a Japanese actress from Tokyo. Her father is
GG, who was a member of Japan's national team of
soccer. She graduated from HH University of music
and made her debut as an actress in 2001. In 2004,
she won the new actress award in the Japan Academy
Awards. In 2005, she played the heroine, JJ, in cinema II
and created a sensation. She is also famous as a pianist,
and played KK concerto in a concert in 2006.

| Category | Actor/Actress | Pianist |
|---|---|---|

FIG. 11C

DOCUMENT Z

Athlete z is from Hokkaido and belongs to LL team.
He was selected as a member of Japan's national team
for the first time in 2001, and has been extending his
record of consecutive appearances since then.
In 2003, he made his debut as a singer. In 2004,
he appeared in three TV commercials.

| Category | Athlete | Singer |
|---|---|---|

FIG. 13A

| DOCUMENT | WORD |
|---|---|
| DOCUMENT X | GRADUATED |
| | PRODUCED |
| | RW SONG FESTIVAL |
| | PHOTO COLLECTION |
| | IMAGE CHARACTER |

FIG. 13B

| DOCUMENT | WORD |
|---|---|
| DOCUMENT Y | TOKYO |
| | JAPAN'S NATIONAL TEAM OF SOCCER |
| | ACADEMY AWARDS |
| | HEROINE |
| | PIANIST |

FIG. 13C

| DOCUMENT | WORD |
|---|---|
| DOCUMENT Z | HOKKAIDO |
| | JAPAN'S NATIONAL TEAM |
| | CONSECUTIVE APPEARANCES |
| | SINGER |
| | TV COMMERCIALS |

FIG. 14

| CATEGORY | TOTAL NUMBER OF DOCUMENTS | NUMBER OF DOCUMENTS CONTAINING "DEBUT" | NUMBER OF DOCUMENTS CONTAINING "SHOW" | NUMBER OF DOCUMENTS CONTAINING "MOZART" |
|---|---|---|---|---|
| ACTOR/ACTRESS | 200 | 150 | 80 | 5 |
| SINGER | 150 | 145 | 20 | 10 |
| MODEL | 100 | 70 | 90 | 1 |
| PIANIST | 30 | 25 | 3 | 27 |

FIG. 15

| WORD | WORD SCORE |
|---|---|
| TOKYO | 1.20 |
| SOCCER | 4.80 |
| JAPAN'S NATIONAL TEAM | 5.20 |
| UNIVERSITY OF MUSIC | 3.50 |
| DEBUT | 2.60 |
| ACADEMY AWARDS | 3.40 |
| ACTRESS AWARD | 3.80 |
| HEROINE | 2.70 |
| PIANIST | 4.90 |
| CONCERTO | 4.20 |

FIG. 16

| NUMBER | SENTENCE SCORE | SENTENCE |
|---|---|---|
| 1 | 1.20 | Actress y is a Japanese actress from Tokyo. |
| 2 | 5.00 | Her father is GG, who was a member of Japan's national team of soccer. |
| 3 | 3.08 | She graduated from HH University of music and made her debut as an actress in 2001. |
| 4 | 3.60 | In 2004, she won the new actress award in the Japan Academy Awards. |
| 5 | 2.70 | In 2005, she played the heroine, JJ, in cinema II and created a sensation. |
| 6 | 4.56 | She is also famous as a pianist, and played KK concerto in a concert in 2006. |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. Particularly, the present invention relates to an information processing apparatus, an information processing method, and a program that enable extraction of a sentence with a high degree of interest to a user.

2. Description of the Related Art

The prevalence of the Internet has enabled users to easily obtain an enormous number of documents. However, it is not easy for users to find a single document from among such an enormous number of documents. Here, the term "document" means a set of one or more sentences.

Therefore, various methods for searching for a document have been used. For example, as a typical method for searching for a document, the following method is widespread. That is, a search engine of a Web site on the Internet searches for a Web page containing an input query word and displays the Web page. However, if a common word or phrase is input as a query word, the number of documents displayed as a search result goes far beyond the range within which a user can find a desired document.

Accordingly, Japanese Unexamined Patent Application Publication No. 2008-077252 discloses the following method as a method for searching for a document by further refining documents. That is, documents are ranked using a reference related to the amount or density of subjects of the documents, and the documents at predetermined ranks are displayed as a search result. This method is called a document ranking method. With the use of the document ranking method, the number of documents displayed as a search result is reduced to some extent to the range within which a user can find a desired document.

SUMMARY OF THE INVENTION

However, a search result that is eventually anticipated by a user is often a result at the sentence level, rather than at the document level. Furthermore, users in recent years have desired a more intriguing sentence, and thus there has been a demand for presenting an interesting sentence as a search result.

Such a demand is not satisfied in the document ranking method. That is, in the document ranking method, documents are ranked using the amount or density of subjects of the documents as an evaluation standard, and thus the degree of commonness or interest of sentences constituting a document is not determined. Thus, it is very difficult to search for an interesting sentence if the document ranking method is used.

Meanwhile, in the field of information searching, term frequency-inverse document frequency (TF-IDF) is widely used as a method for extracting a characteristic word from a document group. A sentence may be searched for by applying TF-IDF to the document ranking method. Even in this case, however, it is difficult to sufficiently satisfy a demand for presenting an interesting sentence as a search result. That is, an IDF value can be an index of commonness/rarity of a word, but is calculated for the entire document group. Thus, a word that is extracted using TF-IDF is not necessarily an interesting word even if the word is a rare word. Therefore, even if a sentence containing a rare word is simply presented as a search result to a user, the sentence is not necessarily of interest to the user.

Accordingly, it is desirable to enable extraction of a sentence with a high degree of interest to a user.

An information processing apparatus according to an embodiment of the present invention includes the following elements: category classifying means for classifying a document into one or more categories among a plurality of categories; word extracting means for extracting one or more words from the document; word score calculating means for calculating a word score for each of the one or more words extracted from the document by the word extracting means on the basis of an appearance frequency of the word in each of the one or more categories into which the document is classified by the category classifying means, the word score serving as an index of interest of the word; sentence-for-computation extracting means for extracting one or more sentences from the document; and sentence score calculating means for calculating a sentence score for each of the one or more sentences extracted by the sentence-for-computation extracting means on the basis of the word score calculated by the word score calculating means, the sentence score serving as an index of interest of the sentence.

The category classifying means may include obtaining means for obtaining a list containing a plurality of keywords capable of specifying any of the plurality of categories, and classifying means for classifying, if the document contains a word that matches any of the plurality of keywords contained in the list, the document into a category that is specified by the keyword that matches the word.

The information processing apparatus may further include sentence score list generating means for generating a list of one or more sentence scores calculated by the sentence score calculating means for the document.

The information processing apparatus may further include sentence-to-be-presented extracting means for extracting one or more sentences with the N highest scores in the one or more sentence scores contained in the list generated by the sentence score list generating means from the document, N being an integer value of one or more, if a degree of commonness of the document is high, and extracting one or more sentences with the M lowest scores in the one or more sentence scores contained in the list from the document, M being an integer value of one or more, if a degree of commonness of the document is low, and presenting means for presenting the one or more sentences extracted by the sentence-to-be-presented extracting means.

The sentence-to-be-presented extracting means may determine a value of N or M on the basis of conditions of presentation to be performed by the presenting means.

An information processing method and program according to an embodiment of the present invention are method and program corresponding to the foregoing information processing apparatus.

In the information processing apparatus, information processing method, and program according to the embodiments of the present invention, a document is classified into one or more categories among a plurality of categories, and one or more words are extracted from the document. A word score, serving as an index of interest of a word, is calculated for each of the one or more words extracted from the document on the basis of an appearance frequency of the word in each of the one or more categories into which the document is classified. One or more sentences are extracted from the document, and a sentence score, serving as an index of interest of a sentence, is calculated for each of the extracted one or more sentences on the basis of the word score.

According to the embodiments of the present invention, a sentence with a high degree of interest to a user can be extracted.

BRIEF DESCRIPTION OF THE DRAWINGS

FIGS. 8A to 8C are diagrams illustrating a specific example of documents;

FIGS. 10A to 10D are diagrams illustrating a result of a category classification process;

FIGS. 11A to 11C are diagrams illustrating another result of the category classification process;

FIGS. 13A to 13C are diagrams illustrating a result of a word extraction process;

FIG. 14 is a diagram illustrating an example of the numbers of documents classified into categories;

FIG. 15 is a diagram illustrating a result of a word score calculation process;

FIG. 16 is a diagram illustrating a list of sentence scores;

DESCRIPTION OF THE PREFERRED EMBODIMENT

Hereinafter, an embodiment of the present invention will be described with reference to the attached drawings.
Example of Configuration of Sentence Extracting System According to Embodiment FIG. 1 is a block diagram illustrating an example of a configuration of a sentence extracting system according to an embodiment of the present invention.

Figure 1:
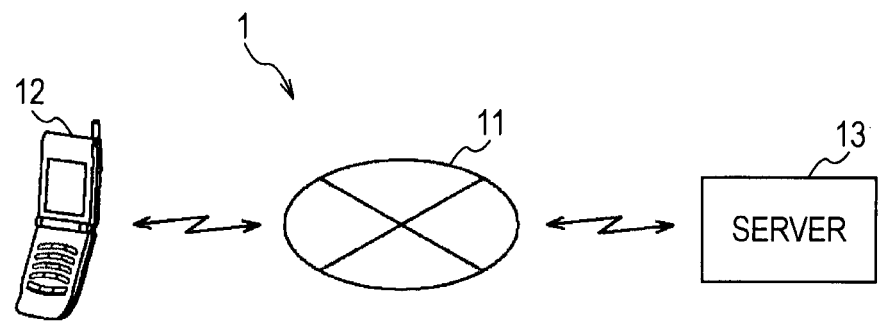
FIG. 1 is a block diagram illustrating a configuration of a sentence extracting system according to an embodiment of the present invention.

The sentence extracting system 1 illustrated in FIG. 1 includes a mobile terminal 12 and a server 13 that are mutually connected via a network 11.

The server 13, which serves as an information processing apparatus, provides various services to other apparatuses connected to the network 11.

The mobile terminal 12 is a mobile phone or the like that is portable by a user, and receives a service from the server 13 by communicating with the server 13 via the network 11.

In this embodiment, the Internet is used as the network 11. However, the network 11 is not limited to the Internet and may have other various forms, such as a local area network (LAN), and may include those forms as a part.
Example of Configuration of Mobile Terminal 12

Figure 2:
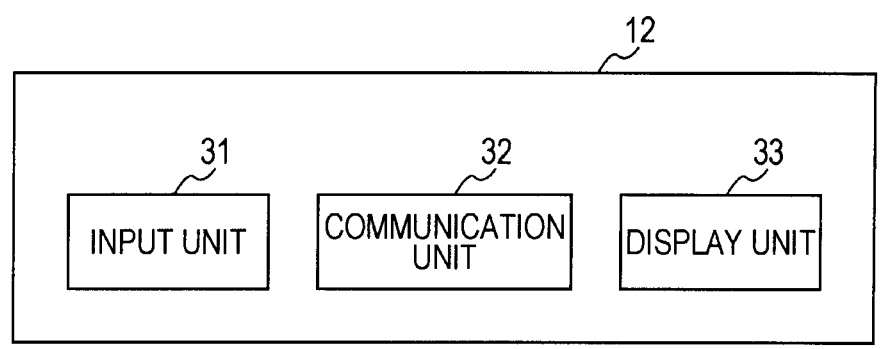
FIG. 2 is a block diagram illustrating an example of a functional configuration of a mobile terminal.

FIG. 2 is a block diagram illustrating an example of a functional configuration of the mobile terminal 12 in the sentence extracting system 1 illustrated in FIG. 1.

The mobile terminal 12 illustrated in FIG. 2 includes an input unit 31, a communication unit 32, and a display unit 33.

The input unit 31 includes buttons and a jog dial, and is operated by a user in order to input a character string, such as a predetermined keyword or uniform resource locator (URL).

The communication unit 32 controls communication performed with the server 13 via the network 11. For example, the communication unit 32 transmits a character string input to the input unit 31 to the server 13 via the network 11. Also, the communication unit 32 receives information transmitted from the server 13 via the network 11, such as sentences and images, when a service is provided from the server 13.

The display unit 33 displays information received by the communication unit 32, such as sentences and images.
Example of Configuration of Server 13

Figure 3:
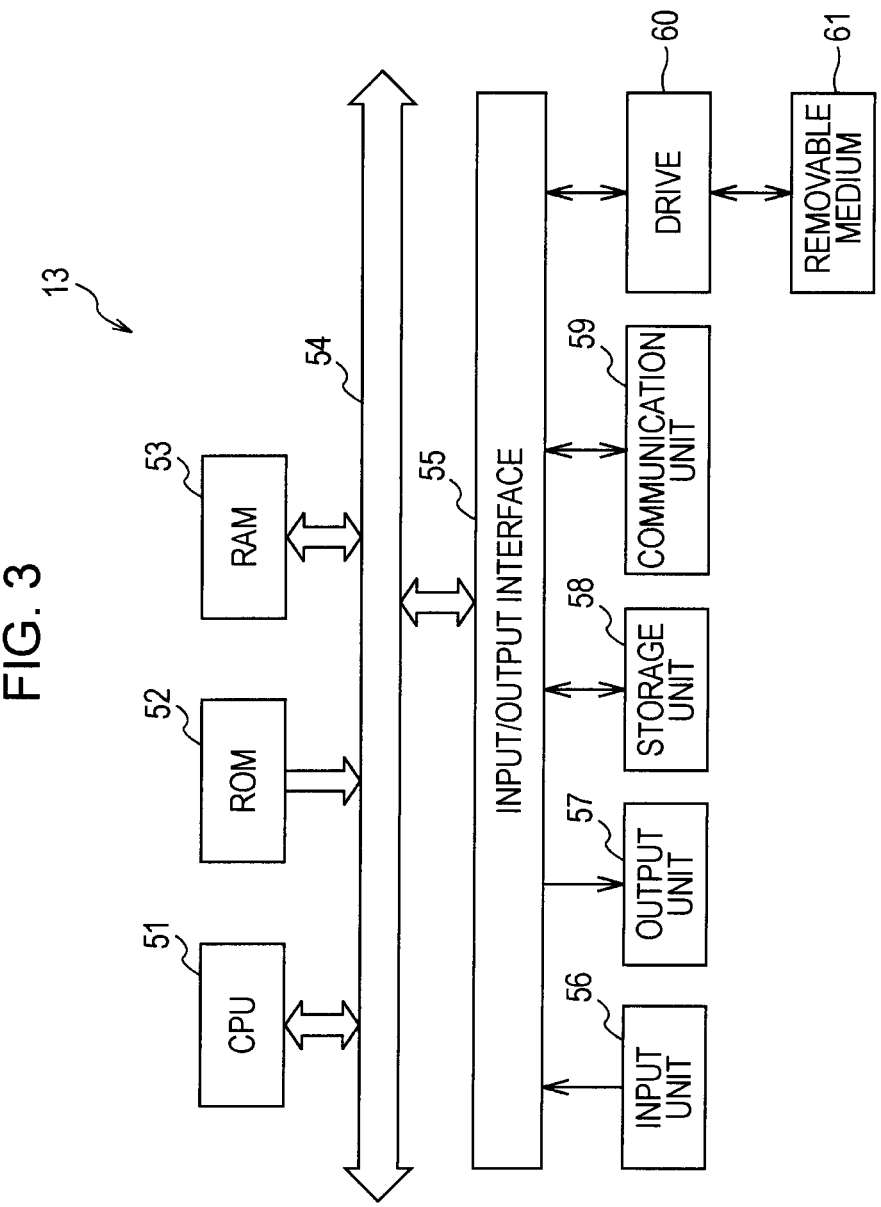
FIG. 3 is a block diagram illustrating an example of a hardware configuration of a server.

FIG. 3 is a block diagram illustrating an example of a hardware configuration of the server 13 in the sentence extracting system 1 illustrated in FIG. 1.

In the server 13 illustrated in FIG. 3, a central processing unit (CPU) 51 executes various processes in accordance with a program stored in a read only memory (ROM) 52 or a program loaded from a storage unit 58 to a random access memory (RAM) 53. Also, data or the like that is necessary for the CPU 51 to execute various processes is stored in the RAM 53 as necessary.

In this embodiment, a program for executing individual functions of a document obtaining unit 81 to a sentence-to-be-presented extracting unit 88 illustrated in FIG. 4 (described below) is stored in the ROM 52 or the storage unit 58, for example. Thus, the individual functions of the document obtaining unit 81 to the sentence-to-be-presented extracting unit 88 may be realized when the CPU 51 executes a process in accordance with the program.

The CPU 51, the ROM 52, and the RAM 53 are mutually connected via a bus 54. An input/output interface 55 is also connected to the bus 54.

The input/output interface 55 is also connected to an input unit 56 including a keyboard and a mouse and an output unit 57 including a display or the like. The input/output interface 55 is also connected to the storage unit 58 including a hard disk and a communication unit 59 including a modem and a terminal adaptor.

The storage unit 58 stores a plurality of types of document groups. One document group is composed of one or more documents containing a predetermined type of content among various documents obtained from various apparatuses (not illustrated) on the network 11. For example, a document group composed of one or more documents containing information about celebrities is stored in the storage unit 58. One document is a set of one or more sentences.

Also, a list of keywords is stored in the storage unit 58. The list of keywords is used in a category classification process of a document, which will be described below with reference to FIG. 9. Furthermore, a list of sentence scores (described below) is stored in the storage unit 58.

The communication unit 59 serving as presenting means controls communication that is performed with the mobile terminal 12 via the network 11.

Also, the input/output interface 55 is connected to a drive 60 as necessary, and a removable medium 61, such as a magnetic disk, an optical disc, a magneto-optical disc, or a semiconductor memory, is loaded into the drive 60. Then, a computer program read therefrom is installed into the storage unit 58 as necessary.

Example of Configuration of CPU 51

Figure 4:
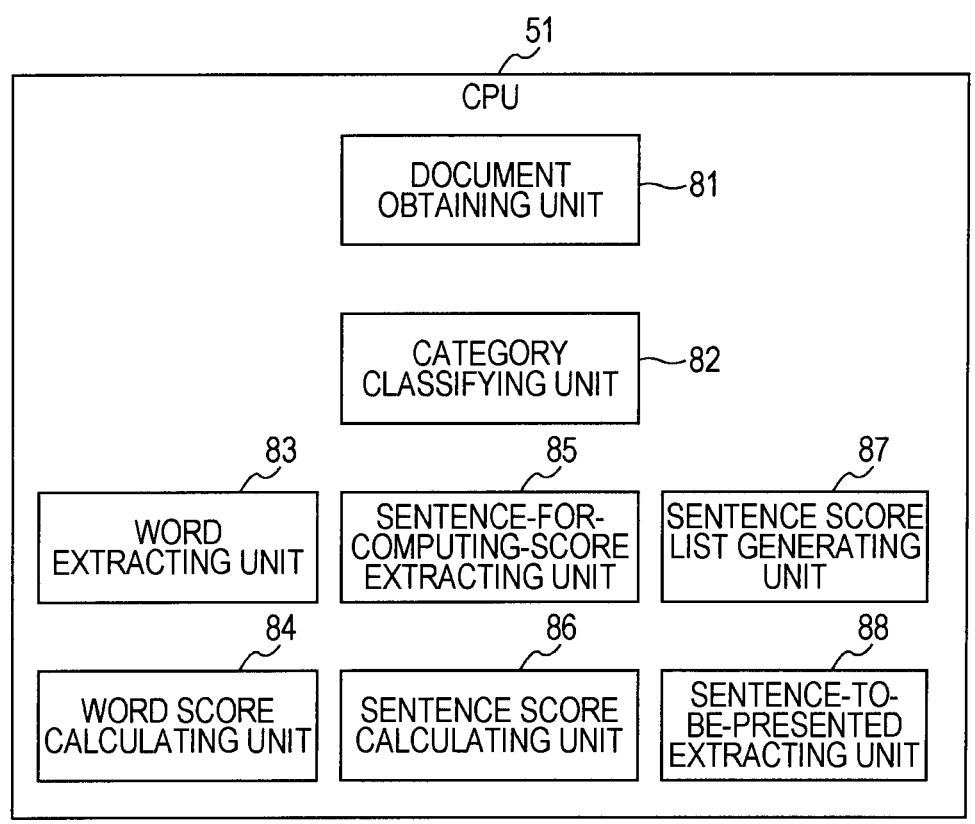
FIG. 4 is a block diagram illustrating an example of a functional configuration of a CPU.

FIG. 4 is a block diagram illustrating an example of a functional configuration of the CPU 51 of the server 13 illustrated in FIG. 3.

The CPU 51 illustrated in FIG. 4 includes a document obtaining unit 81, a category classifying unit 82, a word extracting unit 83, a word score calculating unit 84, a sentence-for-computing-score extracting unit 85, a sentence score calculating unit 86, a sentence score list generating unit 87, and a sentence-to-be-presented extracting unit 88.

The document obtaining unit 81 controls the communication unit 59 to receive a plurality of documents, such as Web pages, from various apparatuses (not illustrated) connected to the network 11, thereby collectively obtaining the plurality of documents as a document group. The obtained document group is stored in the storage unit 58.

The category classifying unit 82 classifies each of the plurality of documents contained in the document group obtained by the document obtaining unit 81 into one or more categories among a plurality of categories.

The document obtaining unit 81 selects, as a processing target, one of documents that have been classified by the category classifying unit 82 from the document group.

The word extracting unit 83 extracts a plurality of words contained in the document as a processing target selected by the document obtaining unit 81.

The word score calculating unit 84 calculates word scores for the individual words extracted by the word extracting unit 83. The word score is a value serving as an index of commonness or rarity of the word. The details of the word score will be described below regarding step S5 in FIG. 7.

The sentence-for-computing-score extracting unit 85 serving as sentence-for-computation extracting means extracts one or more sentences contained in the document as a processing target selected by the document obtaining unit 81.

The sentence score calculating unit 86 calculates sentence scores for the individual one or more sentences extracted by the sentence-for-computing-score extracting unit 85. The sentence score is a value serving as an index of commonness or rarity of the sentence. The details of the sentence score will be described below regarding step S7 in FIG. 7.

The sentence score list generating unit 87 generates a list of sentence scores calculated by the sentence score calculating unit 68 for the individual one or more sentences contained in the document as a processing target.

The sentence-to-be-presented extracting unit 88 extracts, from the document group, a document in which a list of sentence scores has already been generated by the sentence score list generating unit 87. Furthermore, the sentence-to-be-presented extracting unit 88 extracts a sentence to be presented to a user from the extracted document. For example, the sentence-to-be-presented extracting unit 88 extracts a sentence with a high degree of rarity or commonness by using the list of sentence scores. A specific example of a method for extracting a sentence by the sentence-to-be-presented extracting unit 88 will be described below with reference to FIG. 17.

Example of Configuration of Category Classifying Unit 82

Figure 5:
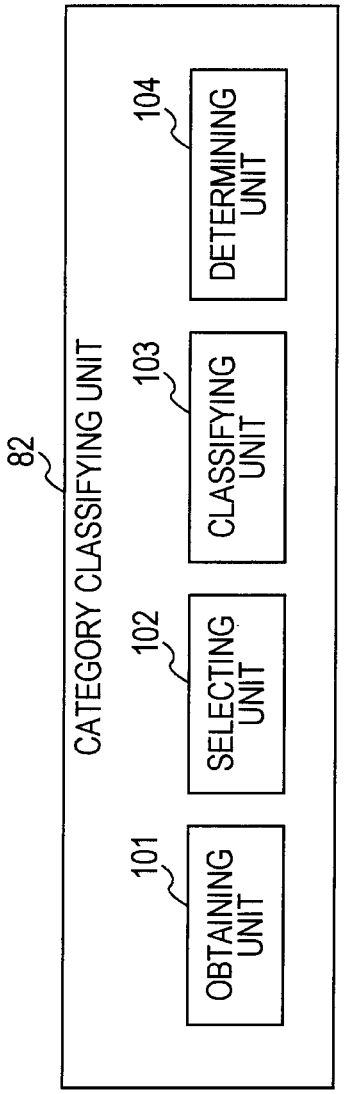
FIG. 5 is a block diagram illustrating an example of a functional configuration of a category classifying unit.

FIG. 5 is a block diagram illustrating an example of a specific functional configuration of the category classifying unit 82 illustrated in FIG. 4.

The category classifying unit 82 illustrated in FIG. 5 includes an obtaining unit 101, a selecting unit 102, a classifying unit 103, and a determining unit 104.

The obtaining unit 101 obtains a list of keywords stored in the storage unit 58. The list of keywords is a list containing one or more keywords that are classified into predetermined categories in advance. The list of keywords is used in the category classification process of a document, which will be described below with reference to FIG. 9.

The selecting unit 102 selects, as a processing target, one document contained in the document group obtained by the document obtaining unit 81.

The classifying unit 103 classifies the document as a processing target selected by the selecting unit 102 into one or more categories among a plurality of categories by using the list of keywords obtained by the obtaining unit 101. Here, note that one document may be classified into a plurality of categories, as well as into one category.

The determining unit 104 determines whether all the documents contained in the document group have been classified. If the determining unit 104 determines that there is a document that has not been classified, the document is selected as a processing target by the selecting unit 102, and a category classification process is performed on the document by the classifying unit 103.

Example of Configuration of Sentence-to-be-Presented Extracting Unit 88

Figure 6:
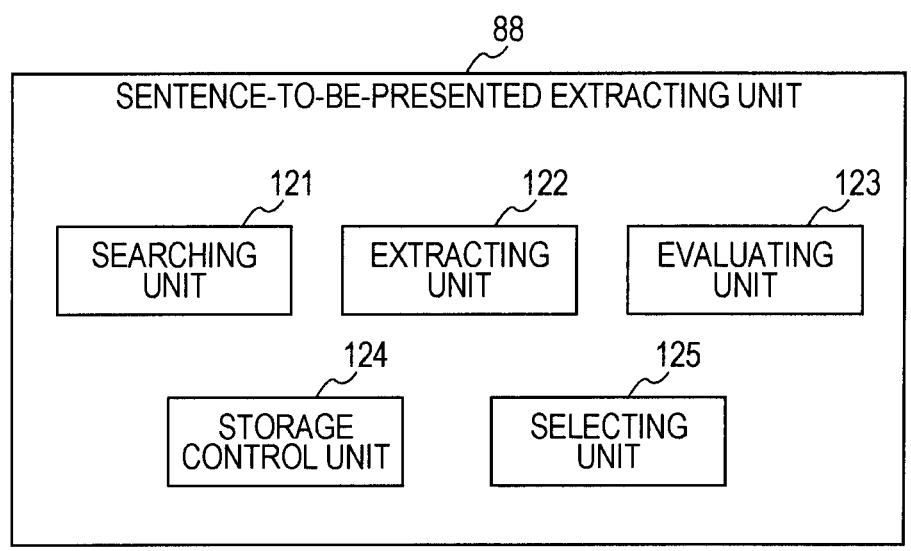
FIG. 6 is a block diagram illustrating an example of a functional configuration of a sentence-to-be-presented extracting unit.

FIG. 6 is a block diagram illustrating an example of a functional configuration of the sentence-to-be-presented extracting unit 88 illustrated in FIG. 4.

The sentence-to-be-presented extracting unit 88 illustrated in FIG. 6 includes a searching unit 121, an extracting unit 122, an evaluating unit 123, a storage control unit 124, and a selecting unit 125.

In this embodiment, a user operates the mobile terminal 12 to provide an instruction to search a document group for a document under a state where the document group and lists of sentence scores generated for the individual documents by the sentence score list generating unit 87 are stored in the storage unit 58.

In this case, the searching unit 121 searches the document group for a predetermined document in response to the instruction provided from the mobile terminal 12.

The extracting unit 122 serving as sentence-to-be-presented extracting means extracts the document that is searched for by the searching unit 121 and the corresponding list of sentence scores from the storage unit 58.

The evaluating unit 123 evaluates the degree of commonness of the document extracted by the extracting unit 122. Evaluating the degree of commonness is equivalent to evaluating the degree of rarity. Alternatively, the evaluating unit 123 may evaluate the popularity of a performer related to the document extracted by the extracting unit 122. Evaluating the popularity is equivalent to evaluating the name recognition. Furthermore, the evaluating unit 123 evaluates the sentences contained in the document extracted by the extracting unit 122 on the basis of the list of sentence scores extracted by the extracting unit 122. A specific example of an evaluation method performed by the evaluating unit 123 will be described below with reference to FIGS. 17 and 18.

The extracting unit 122 extracts one or more sentences to be presented to a user from the previously extracted document on the basis of the evaluation made by the evaluating unit 123.

The storage control unit 124 stores the sentence(s) extracted by the extracting unit 122 in the storage unit 58, the sentence(s) being a candidate to be displayed on the mobile terminal 12. Note that the candidate may be one sentence or a plurality of sentences.

The selecting unit 125 selects one or more sentences that satisfy conditions of a display area of the mobile terminal 12 from the candidate sentences stored by the storage control unit 124, and presents the selected sentence(s) on the mobile terminal 12 via the communication unit 59.

Sentence Score Calculation Process

In the sentence extracting system 1 according to the embodiment of the present invention, a sentence score calculation process is performed. In this process, the server 13 calculates sentence scores for individual sentences contained in a document and generates a list of the sentence scores. The sentence score calculation process is repeatedly performed for the individual documents constituting the document group stored in the storage unit 58. Then, as described below with reference to FIG. 17, etc., a process of presenting a user with a sentence with a high degree of interest is performed by using the list of sentence scores stored in the storage unit 58. That is, the sentence score calculation process is performed as preprocessing for presenting a user with a sentence with a high degree of interest.

Figure 7:
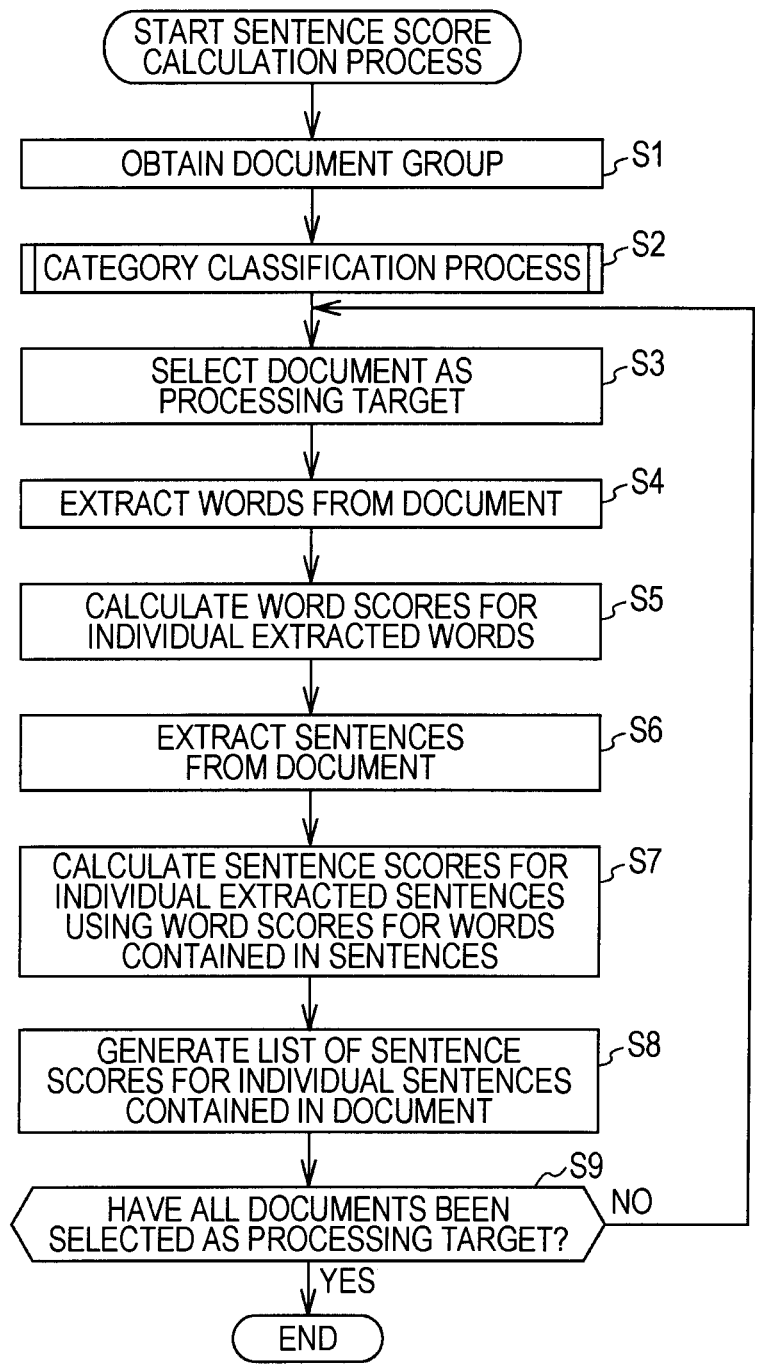
FIG. 7 is a flowchart illustrating an example of a sentence score calculation process.

FIG. 7 is a flowchart illustrating an example of a sentence score calculation process performed by the server 13.

In step S1, the document obtaining unit 81 obtains a document group. That is, the document obtaining unit 81 controls the communication unit 59 to receive a plurality of documents, such as Web pages, from various apparatuses (not illustrated) connected to the network 11, thereby collectively obtaining the plurality of documents as a document group. The obtained document group is stored in the storage unit 58.

Now, a specific example of documents contained in a document group will be described with reference to FIGS. 8A to 8C.

FIGS. 8A to 8C are diagrams illustrating a specific example of documents.

FIGS. 8A, 8B, and 8C illustrate documents X, Y, and Z, respectively, which are contained in a document group related to celebrities.

In documents X, Y, and Z, which are English-language documents, sentences are divided using periods.

Document X illustrated in FIG. 8A has the following content: "Singer x graduated from AA high school in 2000. She made her debut as a singer with "CC" produced by B. In 2002, she made her first appearance in RW song festival and sang "DD". In 2003, she held EE party to commemorate the release of her photo collection. In 2005, she acted as an image character of FF group."

Document Y illustrated in FIG. 8B has the following content: "Actress y is a Japanese actress from Tokyo. Her father is GG, who was a member of Japan's national team of soccer. She graduated from HH University of music and made her debut as an actress in 2001. In 2004, she won the new actress award in the Japan Academy Awards. In 2005, she played the heroine, JJ, in cinema II and created a sensation. She is also famous as a pianist, and played KK concerto in a concert in 2006."

Document Z illustrated in FIG. 8C has the following content: "Athlete z is from Hokkaido and belongs to LL team. He was selected as a member of Japan's national team for the first time in 2001, and has been extending his record of consecutive appearances since then. In 2003, he made his debut as a singer. In 2004, he appeared in three TV commercials."

In step S2, the category classifying unit 82 performs a category classification process.

Now, a specific example of the category classification process will be described.

Figure 9:
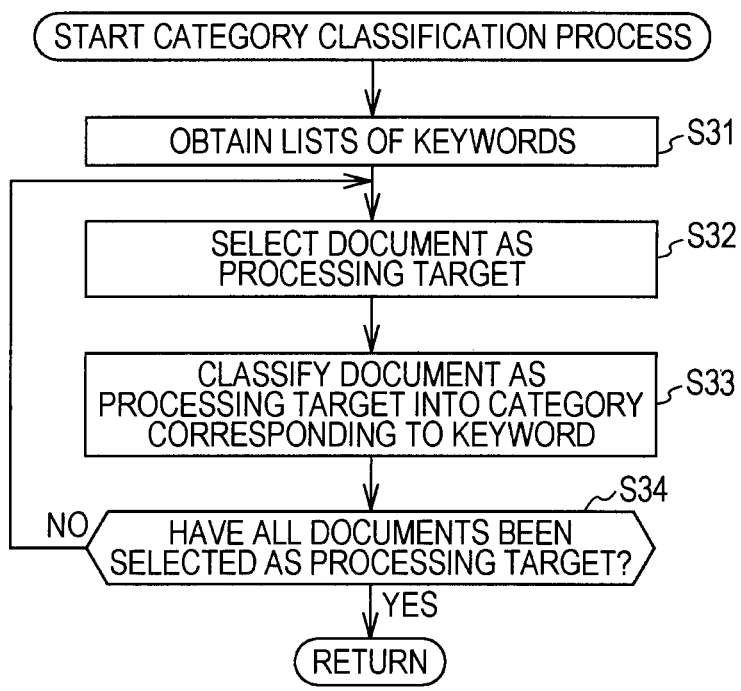
FIG. 9 is a flowchart illustrating an example of a category classification process.

FIG. 9 is a flowchart illustrating an example of the category classification process performed by the category classifying unit 82.

In step S31, the obtaining unit 101 obtains lists of keywords. Here, a list of keywords is a list containing one or more keywords that are classified in advance into a predetermined category. For example, a list of keywords belonging to a category "singer" is a list containing keywords that are classified in advance into a category "singer", such as "album" and "RW song festival". Such a list of keywords is obtained for each category. For example, in this embodiment, lists of keywords belonging to four categories: "singer"; "pianist"; "actor/actress"; and "athlete", are obtained (not illustrated).

In step S32, the selecting unit 102 selects a document as a processing target. That is, the selecting unit 102 selects one document as a processing target from the document group obtained in step S1 in FIG. 7.

In step S33, the classifying unit 103 classifies the document as a processing target into a category corresponding to a keyword. That is, the classifying unit 103 searches the list of keywords for a keyword that matches a word contained in the document as a processing target. If the keyword that matches a word is found, the document as a processing target is classified into the category to which the list containing the keyword belongs.

In step S34, the determining unit 104 determines whether all the documents have been selected as a processing target.

If it is determined in step S34 that all the documents have not been selected as a processing target, the process is repeated from step S32. That is, the documents contained in the document group obtained in step S1 are selected one after another as a processing target and are classified in the loop process from step S32 to step S34 that is repeated. When step S33 performed on the last document ends, category classification of all the documents contained in the document group obtained in step S1 ends. Then, it is determined in step S34 that all the documents have been selected as a processing target, and the category classification process ends.

In the foregoing example of the category classification process, a method for classifying a document into a category by using an artificial keyword based on collective intelligence is employed. However, the category classification method is not particularly limited to the foregoing example, and a category classification method based on machine learning may also be employed.

As a category classification method based on machine learning, a naive Bayes classifier applying Bayes' theorem may be used, for example. The naive Bayes classifier calculates the probability that "each word" contained in document D belongs to category C. Also, the naive Bayes classifier totalizes the probability that each word belongs to category C and calculates the probability that "document D" belongs to category C. That is, the probability P(C|D) that document D belongs to category C is calculated using the following expression (1).

$$P(C|D)=(P(C)/P(D))*P(D|C) \tag{1}$$

In this embodiment, documents X, Y, and Z are classified into categories in the manner illustrated in FIGS. 10A to 11C, as a result of the foregoing category classification process.

FIGS. 10A to 10D are diagrams illustrating a result of the category classification process and a result viewed from the standpoint of categories.

In FIGS. 10A to 10D, documents X, Y, and Z contained in the document group related to celebrities are classified into one or more categories among the four categories: "singer"; "pianist"; "actor/actress"; and "athlete".

As illustrated in FIG. 10A, documents X and Z belong to the category "singer".

As illustrated in FIG. 10B, document Y belongs to the category "pianist".

As illustrated in FIG. 10C, document Y belongs to the category "actor/actress".

As illustrated in FIG. 10D, document Z belongs to the category "athlete".

FIGS. 11A to 11C are diagrams illustrating a result of the category classification process and a result viewed from the standpoint of documents.

As illustrated in FIG. 11A, a tag representing a category to which the document belongs, that is, a tag representing the category "singer", is attached to document X.

As illustrated in FIG. 11B, tags representing categories to which the document belongs, that is, tags representing the categories "actor/actress" and "pianist", are attached to document Y.

As illustrated in FIG. 11C, tags representing categories to which the document belongs, that is, tags representing the categories "athlete" and "singer", are attached to document Z.

As illustrated in FIGS. 10A to 11C, document Y is classified into the two categories "actor/actress" and "pianist". Document Z is classified into the two categories "athlete" and "singer". In this way, one document may be classified into a plurality of categories.

Referring back to the flowchart in FIG. 7, after the foregoing category classification process in step S2 has ended, the document obtaining unit 81 selects a document as a processing target in step S3. That is, the document obtaining unit 81 selects, as a processing target, one of the documents that have been classified into categories.

In step S4, the word extracting unit 83 extracts words from the document as a processing target.

Now, a specific example of a process of extracting words from a document as a processing target (hereinafter referred to as word extraction process) will be described.

As a method for the word extraction process, a method for performing morphological analysis on an entire document and extracting words at the level of part of speech is available. Hidden Markov model is an example of a statistical method that is widely used in morphological analysis of Japanese, English, etc. Hidden Markov model is a method for listing all word sequences that can be generated from an input sentence, giving scores to the probabilities that words appear while being concatenated, and extracting a part-of-speech sequence with the highest score in the sentence. This method does not depend on a language used because various morphological analysis systems are provided for individual languages.

Figure 12:
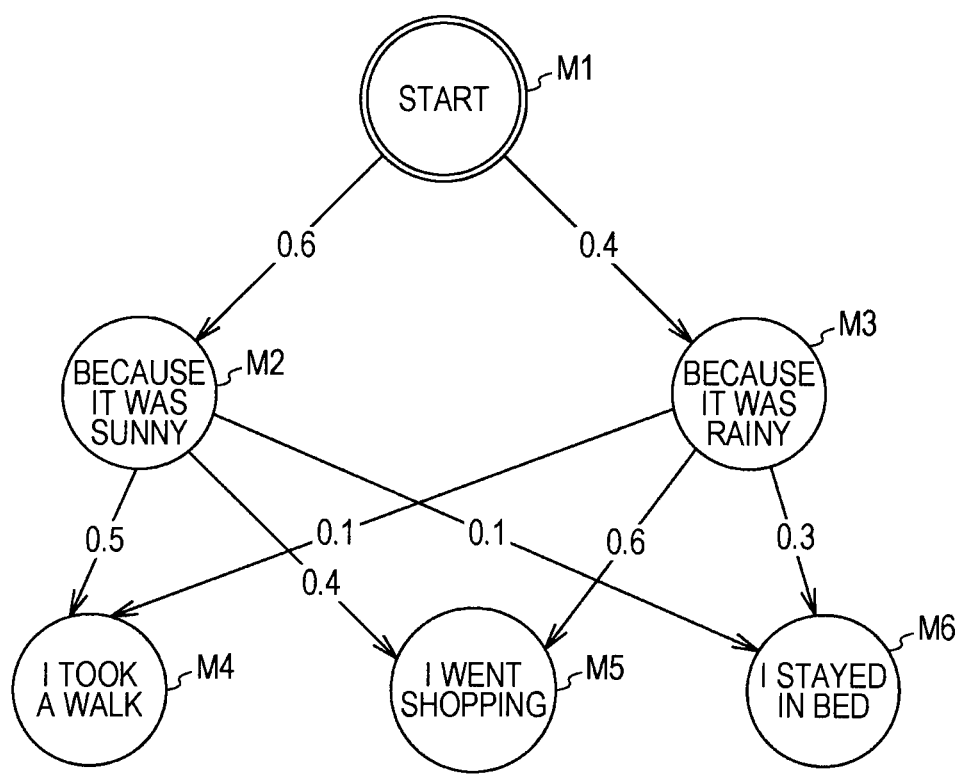
FIG. 12 is a diagram illustrating an example of a probability model of a hidden Markov model.

FIG. 12 is a diagram illustrating an example of a probability model of hidden Markov model.

Referring to FIG. 12, a symbol of state M1 is given to an initial state "start", when a sentence is input. Individual word sequences that can be generated from the input sentence are shown in circular nodes, and symbols of state M2 to state M6 are given to the individual nodes. Among state M1 to state M6, the transition from a first state to a second state is indicated by an arrow extending from the first state to the second state, and the value in the arrow represents the probability that the transition from the first state to the second state occurs. That is, the value in the arrow represents the probability that the word sequence shown in the first state and the word sequence shown in the second state appear while being concatenated.

Specifically, the probability that the transition from "start" in state M1 to "Because it was sunny" in state M2 occurs is 0.6, and the probability that the transition from state M1 to "Because it was rainy" in state M3 occurs is 0.4. That is, regarding the probability of appearance of the word sequence "Because it was sunny" in state M2 and the word sequence "Because it was rainy" in state M3 in concatenation with the initial state, the word sequence "Because it was sunny" in state M2 has a probability higher than that of the word sequence "Because it was rainy" in state M3.

The probability that the transition from "Because it was sunny" in state M2 to "I took a walk" in state M4 occurs, the probability that the transition from state M2 to "I went shopping" in state M5 occurs, and the probability that the transition from state M2 to "I stayed in bed" in state M6 occurs are 0.5, 0.4, and 0.1, respectively. That is, if the word sequence "Because it was sunny" in state M2 is input, the probability that the word sequence "I took a walk" in state M4 or the word sequence "I went shopping" in state M5 appears in concatenation is high. In contrast, if the word sequence "Because it was sunny" in state M2 is input, the probability that the word sequence "I stayed in bed" in state M6 appears in concatenation is low. Thus, in the example illustrated in FIG. 12, the probability that the word sequence "I took a walk" in state M4 appears in concatenation with the word sequence "Because it was sunny" in state M2 and the probability that the word sequence "I went shopping" in state M5 appears in concatenation therewith are high at 0.5 and 0.4, respectively. In contrast, the probability that the word sequence "I stayed in bed" in state M6 appears in concatenation with the word sequence "Because it was sunny" in state M2 is low at 0.1.

Likewise, the probability that the transition from "Because it was rainy" in state M3 to "I took a walk" in state M4 occurs, the probability that the transition from state M3 to "I went shopping" in state M5 occurs, and the probability that the transition from state M3 to "I stayed in bed" in state M6 occurs are 0.1, 0.6, and 0.3, respectively. That is, if the word sequence "Because it was rainy" in state M3 is input, the probability that the word sequence "I went shopping" in state M5 or the word sequence "I stayed in bed" in state M6 appears in concatenation is high. In contrast, if the word sequence "Because it was rainy" in state M3 is input, the probability that the word sequence "I took a walk" in state M4 appears in concatenation is low. Thus, in the example illustrated in FIG. 12, the probability that the word sequence "I went shopping" in state M5 appears in concatenation with the word sequence "Because it was rainy" in state M3 and the probability that the word sequence "I stayed in bed" in state M6 appears in concatenation therewith are high at 0.6 and 0.3, respectively. In contrast, the probability that the word sequence "I took a walk" in state M4 appears in concatenation with the word sequence "Because it was rainy" in state M3 is low at 0.1.

As a result of using the probability model of hidden Markov illustrated in FIG. 12, the score of the entire sentence "Because it was sunny, I took a walk.", which is generated through concatenation of "Because it was sunny" in state M2 and "I took a walk" in state M4, is 0.6×0.5=0.3. The score of the entire sentence "Because it was sunny, I went shopping.", which is generated through concatenation of "Because it was sunny" in state M2 and "I went shopping" in state M5, is 0.6×0.4=0.24. The score of the entire sentence "Because it was sunny, I stayed in bed.", which is generated through concatenation of "Because it was sunny" in state M2 and "I stayed in bed" in state M6, is 0.6×0.1=0.06. Thus, the sentence with the highest score "Because it was sunny, I took a walk." is selected from among those three sentences, and part-of-speech sequences "Because it was sunny" and "I took a walk" contained in the sentence are extracted.

Likewise, the score of the entire sentence "Because it was rainy, I took a walk.", which is generated through concatenation of "Because it was rainy" in state M3 and "I took a walk" in state M4, is 0.4×0.1=0.04. The score of the entire sentence "Because it was rainy, I went shopping.", which is generated through concatenation of "Because it was rainy" in state M3 and "I went shopping" in state M5, is 0.4×0.6=0.24. The score of the entire sentence "Because it was rainy, I stayed in bed.", which is generated through concatenation of "Because it was rainy" in state M3 and "I stayed in bed" in state M6, is 0.4×0.3=0.12. Thus, the sentence with the highest score "Because it was rainy, I went shopping." is selected from among those three sentences, and part-of-speech sequences "Because it was rainy" and "I went shopping" contained in the sentence are extracted.

In this embodiment, a method for performing morphological analysis on an entire document and extracting words in units of part of speeches, as in the above-described hidden Markov model, is employed as a method for extracting words in the foregoing word extraction process. However, the method for extracting words is not particularly limited to the example according to this embodiment. For example, a method for extracting only words in which a link is set may be employed with limitation to hyperlink. If this method is employed, the method of a free encyclopedia such as "Wikipedia", in which a link is set to characteristic words, may be used.

In any word extraction method, the words to be extracted through the word extraction process may cover all the words in a document or a plurality of words that satisfy a predetermined standard.

As a result of the foregoing word extraction process, words are extracted from documents X, Y, and Z, as illustrated in FIGS. 13A to 13C in this embodiment.

FIGS. 13A to 13C are diagrams illustrating a result of the word extraction process.

As illustrated in FIG. 13A, the words "graduated", "produced", "RW song festival", "photo collection", and "image character" are extracted from document X.

As illustrated in FIG. 13B, the words "Tokyo", "Japan's national team of soccer", "Academy Awards", "heroine", and "pianist" are extracted from document Y.

As illustrated in FIG. 13C, the words "Hokkaido", "Japan's national team", "consecutive appearances", "singer", and "TV commercials" are extracted from document Z.

Referring back to the flowchart in FIG. 7, after the word extraction process in step S4, the word score calculating unit 84 calculates word scores for the individual extracted words in step S5.

Now, a specific example of a process of calculating word scores for the individual extracted words (hereinafter referred to as word score calculation process) will be described.

According to the related art, calculation of an IDF value is performed on an entire document group. However, in the server 13 according to this embodiment, calculation of an IDF value is performed on a category by the word score calculating unit 84. Thus, the IDF value that is calculated for a category by the word score calculating unit 84 is referred to as F value. The F value is expressed by the following expression (2).

$$F_{t,c} = \log\left(\prod_{c \in T} \frac{N_c}{df_{t,c}}\right) \quad (2)$$

In expression (2), T represents a category set to which documents belong, C represents a category to which documents belong, $N_C$ represents the total number of documents belonging to category C, and $df_{t,C}$ represents the number of documents containing word t among the documents belonging to category C. Thus, the F value, i.e., $F_{t,C}$ expressed by expression (2), may be regarded as a value obtained through modeling of the appearance frequency of word t in the category. In this embodiment, the F value calculated using expression (2) is used as a word score.

For example, in category C to which $N_C$ documents belong, as the number $df_{t,C}$ of documents containing word t is larger, word t is determined to be a word with a high degree of commonness. In category C to which $N_C$ documents belong, when the number $df_{t,C}$ of documents containing word t is large, the F value as a word score is small in accordance with expression (2).

In contrast, in category C to which $N_C$ documents belong, as the number $df_{t,C}$ of documents containing word t is smaller, word t is determined to be a word with a high degree of rarity. In category C to which $N_C$ documents belong, when the number $df_{t,C}$ of documents containing word t is small, the F value as a word score is large in accordance with expression (2).

As described above, the degree of rarity of word t is higher as the word score is higher, and the degree of commonness of word t is higher as the word score is lower. Thus, the word score serves as an index of commonness and rarity of word t.

Furthermore, word t with a high word score as an F value may be recognized as a word with a high degree of interest. That is, in the related art in which an IDF value is used, a word with a low appearance frequency is determined to be a word with a high degree of rarity in all sentences regardless of categories. For example, there can exist a word that often appears in a certain category and that does not at all appear in another category. Such a word has a high appearance frequency in the category but has a low appearance frequency in all sentences, and is thus determined to be a word with a high degree of rarity according to the related art. Such a word may be certainly rare in all sentences, but is not determined to be a word with a high degree of interest because it often appears in sentences in the category. That is, in the related art, even if a word is determined to be a word with a low appearance frequency, the word is not absolutely determined to be a word with a high degree of interest.

In contrast, regarding word t with a high word score calculated using expression (2), the appearance frequency of the word is calculated in the category. Thus, a high degree of rarity means a low appearance frequency in the category. Furthermore, this means that the appearance in a document belonging to the category is of interest. That is, a word with a high word score and a high degree of rarity is determined to be a word with a high degree of interest.

In this embodiment, a word score is calculated using expression (2), but the calculation method is not particularly limited and any method for modeling the appearance frequency of a word in a category may be used. For example, in expression (2), a common logarithm with respect to the total product of individual scores is used, with ($N_C/df_{t,C}$) in one category C being referred to as a score. However, the reason for using a common logarithm in expression (2) is to even unevenness of scores in individual categories. Thus, using a common logarithm is not necessary for computing a word score. Alternatively, a word score may be calculated on the basis of a simple total sum of individual scores or a total product of individual scores with a weight applied on an important category, instead of a total product of individual scores according to this embodiment.

Hereinafter, the word score calculation process will be described in detail with reference to FIG. 14.

FIG. 14 is a diagram illustrating an example of the numbers of documents classified into categories.

In the example illustrated in FIG. 14, documents are classified into four categories "actor/actress", "singer", "model", and "pianist", and the numbers of documents classified into the individual categories are shown as "total number of documents". Furthermore, among the documents classified into the individual categories, the numbers of documents containing the words "debut", "show", and "Mozart" are shown as "number of documents containing "debut"", "number of documents containing "shown"", and "number of documents containing "Mozart"", respectively.

For example, in accordance with the foregoing examples illustrated in FIGS. 10A to 10D and FIGS. 11A to 11C, document Y is classified into the two categories "actor/actress" and "pianist". In such a case, the F value of the word "debut" contained in document Y is log(200/150×30/25)= 0.2041 according to expression (2).

When the word score calculation process is performed in the above-described manner, the word scores illustrated in FIG. 15 are calculated, for example. FIG. 15 is a diagram illustrating a result of the word score calculation process.

Here, document Y is selected as a processing target. The word scores illustrated in FIG. 15 are obtained through calculation on only characteristic noun phrases, not on all the words contained in the document. That is, the word scores as F values are calculated for the words "Tokyo", "soccer", "Japan's national team", "university of music", "debut", "Academy awards", "actress award", "heroine", "pianist", and "concerto" contained in document Y.

In the example illustrated in FIG. 15, the word score for "Tokyo" is 1.20, the word score for "soccer" is 4.80, the word score for "Japan's national team" is 5.20, the word score for "university of music" is 3.50, and the word score for "debut" is 2.60. Also, the word score for "Academy awards" is 3.40, the word score for "actress award" is 3.80, the word score for "heroine" is 2.70, the word score for "pianist" is 4.90, and the word score for "concerto" is 4.20.

As illustrated in FIG. 15, in document Y that is classified into the categories "actor/actress" and "pianist", "Tokyo" with the lowest word score is recognized as a word with the highest degree of commonness, and "Japan's national team" with the highest word score is recognized as a word with the highest degree of rarity, that is, a word with the highest degree of interest.

Referring back to the flowchart in FIG. 7, after the foregoing word score calculation process in step S5, the sentence-for-computing-score extracting unit 85 extracts one or more sentences from the document as a processing target in step S6. Specifically, the sentence-for-computing-score extracting unit 85 extracts a character string that ends with a period as one sentence. Also, the sentence-for-computing-score extracting unit 85 extracts an itemized list item as one sentence. The sentence to be extracted may be one sentence or a plurality of sentences contained in the document as a processing target. Note that, since sentence scores are calculated on the basis of the word scores contained in extracted sentences in step S7 (described below), it is preferable that sentences having a similar number of words be extracted.

In step S7, the sentence score calculating unit 86 calculates sentence scores of the individual extracted sentences by using the word scores for the words contained in the sentences. Hereinafter, the process performed in step S7 will be referred to as sentence score calculation process.

The sentence score calculating unit 86 calculates a sentence score in accordance with the following expression (3), for example.

$$\text{Score} = \sqrt{\frac{\sum_{i \in N} F_i^2}{N}} \qquad (3)$$

In expression (3), Score represents a sentence score, N represents the number of words whose word score has been calculated in the sentence, and $F_i$ represents an F value, which is a calculated word score.

As is clear from the numerator in the root on the right side of expression (3), the sentence score is higher as the word score $F_i$ of each word contained in the sentence is higher. Thus, a word with a high word score $F_i$ is determined to be a word with a high degree of rarity and a high degree of interest, as described above, and thus a sentence with a high sentence score is determined to be a sentence with a high degree of rarity and a high degree of interest.

In contrast, the sentence score is lower as the word score $F_i$ of each word contained in the sentence is lower. Thus, a word with a low word score $F_i$ is determined to be a word with a high degree of commonness, and thus a sentence with a low sentence score is determined to be a sentence with a high degree of commonness.

As shown in expression (3), a method for calculating a root-mean-square of word scores is employed as a method for calculating a sentence score in this embodiment. However, the method for calculating a sentence score is not limited thereto. For example, a method for calculating a simple arithmetic mean of word scores may be employed.

Referring back to the flowchart in FIG. 7, after the sentence score calculation process in step S7, the sentence score list generating unit 87 generates a list of sentence scores for the individual sentences contained in the document as a processing target in step S8.

FIG. 16 is a diagram illustrating a list of sentence scores.

As illustrated in FIG. 16, sentence scores for the individual extracted sentences are calculated using expression (3). Numbers are assigned to the individual extracted sentences. The sentence score for the sentence No. 1 "Actress y is a Japanese actress from Tokyo." is 1.20. The sentence score for the sentence No. 2 "Her father is GG, who was a member of Japan's national team of soccer." is 5.00. The sentence score for the sentence No. 3 "She graduated from HH University of music and made her debut as an actress in 2001." is 3.08. The sentence score for the sentence No. 4 "In 2004, she won the new actress award in the Japan Academy Awards." is 3.60. The sentence score for the sentence No. 5 "In 2005, she played the heroine, JJ, in cinema II and created a sensation." is 2.70. The sentence score for the sentence No. 6 "She is also famous as a pianist, and played KK concerto in a concert in 2006." is 4.56.

As illustrated in FIG. 16, among the sentences No. 1 to No. 6, the sentence No. 1 with the lowest sentence score is determined to be a sentence with the highest degree of commonness. Among the sentences No. 1 to No. 6, the sentence No. 2 with the highest sentence score is determined to be a sentence with the highest degree of rarity and the highest degree of interest.

Referring back to the flowchart in FIG. 7, after the list of sentence scores is generated in step S8, the document obtaining unit 81 determines whether all the documents have been selected as a processing target in step S9.

If it is determined in step S9 that all the document have not been selected as a processing target, the process returns to step S3, and the process is repeated. That is, the documents contained in the document group obtained in step S1 are selected one after another as a processing target, the loop process from step S3 to step S9 is repeated, and sentence scores are calculated. When step S8 on the last document ends, calculation of sentence scores for all the documents contained in the document group obtained in step S1 ends. Then, it is determined in step S9 that all the documents have been selected as a processing target, and the sentence score calculation process ends.

In this way, the server 13 extracts a sentence with a high sentence score calculated in the sentence score calculation process, thereby being capable of presenting a sentence with a high degree of rarity and a high degree of interest, i.e., a sentence that is more intriguing to a user.

Hereinafter, a description will be given of an example of a process of extracting a sentence (hereinafter referred to as sentence extraction process) using sentence scores calculated through the foregoing sentence score calculation process. The following example is a process performed by the server 13 when a user operates the mobile terminal 12 to search for a document or the like.

Sentence Extraction Process

Figure 17:
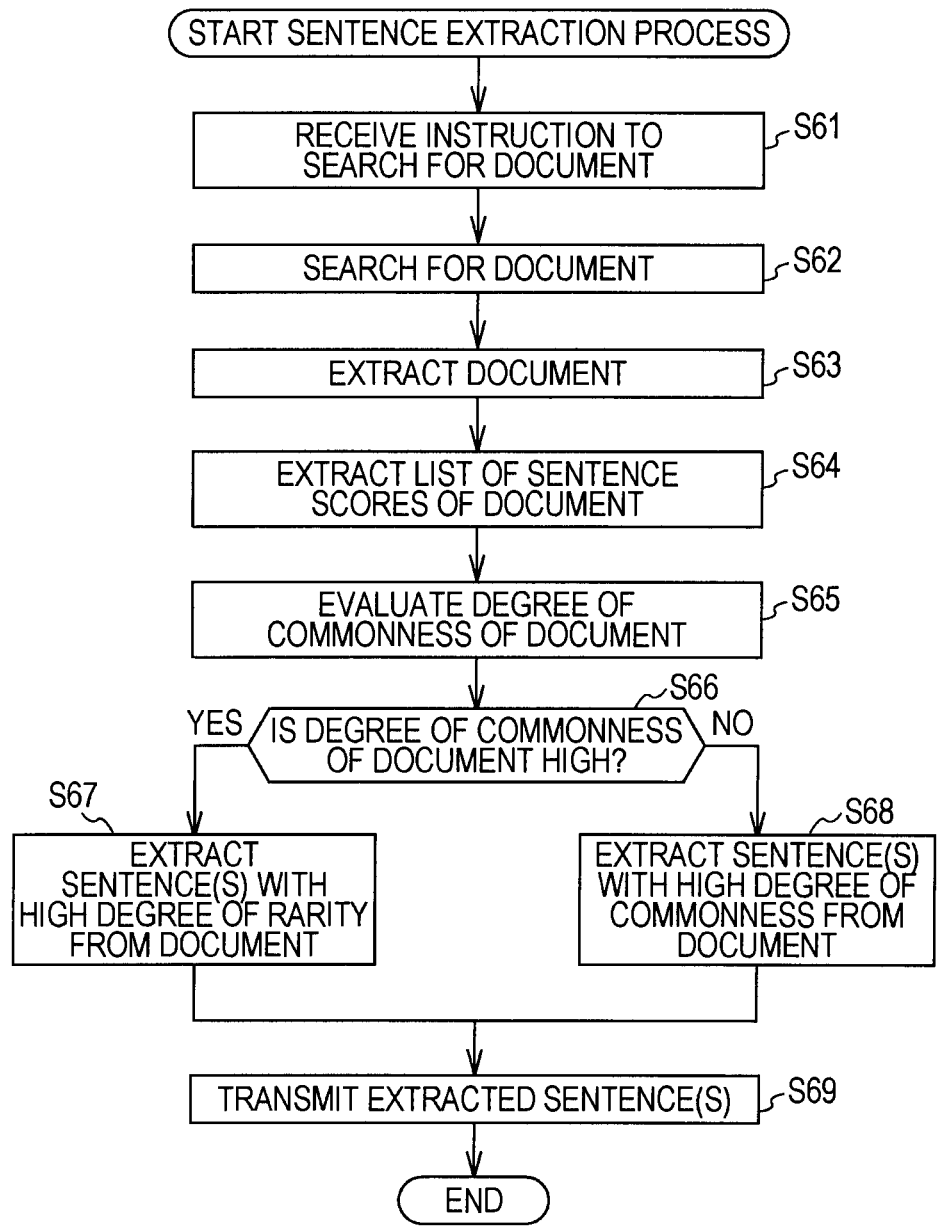
FIG. 17 is a flowchart illustrating an example of a sentence extraction process.

FIG. 17 is a flowchart illustrating an example of a sentence extraction process performed by the sentence-to-be-presented extracting unit 88 of the server 13.

In step S61, the searching unit 121 receives an instruction to search for a document. That is, the searching unit 121 receives an instruction to search for a document from the mobile terminal 12 via the communication unit 59.

In step S62, the searching unit 121 searches for a document. That is, the searching unit 121 searches the document group stored in the storage unit 58 for a document on the basis of the instruction provided from the mobile terminal 12.

In step S63, the extracting unit 122 extracts a document. That is, the extracting unit 122 extracts the document that is searched for by the searching unit 121 from the storage unit 58.

In step S64, the extracting unit 122 extracts the list of document scores of the document. That is, the extracting unit 122 extracts the list of document scores of the document extracted in step S63 from the storage unit 58.

In step S65, the evaluating unit 123 evaluates the degree of commonness of the document. Evaluating the degree of commonness is equivalent to evaluating the degree of rarity.

Now, some specific examples of a method for evaluating the degree of commonness of the document will be described.

As a method for evaluating the degree of commonness of the document, a method for using the number of references of the document as an evaluation target on a Web site may be employed, for example. According to this method, if the document as an evaluation target is a Web page, the number of references is calculated using the number of times of being linked. Thus, if the number of references to the document as an evaluation target is larger than a threshold, the document is evaluated as a document with a high degree of commonness. If the number of references to the document is equal to or smaller than the threshold, the document is evaluated as a document with a high degree of rarity. The number of times of being linked is obtained at the time of step S1 in FIG. 7 in this embodiment. However, the timing to obtain the number is not particularly limited to the example of this embodiment, and any timing before the time of step S65 is acceptable.

Also, if the document as an evaluation target is searched for by using a typical search engine of a Web site on the Internet, a method for using the number of hits may be employed as a method for evaluating the degree of commonness of the document. According to this method, if the number of hits of the document as an evaluation target is larger than a threshold, the document is evaluated as a document with a high degree of commonness. If the number of hits is equal to or smaller than the threshold, the document is evaluated as a document with a high degree of rarity. The number of hits is obtained at the time of step S1 in FIG. 7 in this embodiment. However, the timing to obtain the number is not particularly limited to the example of this embodiment, and any timing before the time of step S65 is acceptable.

Also, if the document as an evaluation target is a document in a blog site, a method for using the number of appearances of the document may be employed as a method for evaluating the degree of commonness of the document. According to this method, if the number of appearances of information related to the document as an evaluation target in a blog site during a predetermined period is larger than a threshold, the document is evaluated as a document with a high degree of commonness. If the number of appearance is equal to or smaller than the threshold, the document is evaluated as a document with a high degree of rarity. The number of appearances in the blog site during the predetermined period is obtained at the time of step S1 in FIG. 7 in this embodiment. However, the timing to obtain the number is not particularly limited to the example of this embodiment, and any timing before the time of step S65 is acceptable.

The evaluation result of the degree of commonness of the document obtained through the foregoing methods serves as an index indicating the popularity of the document itself. For example, if the document as an evaluation target is a document about a predetermined person and if the document is evaluated as a document with a high degree of commonness, the predetermined person may be estimated to be a celebrity. Therefore, in this case, a sentence with a high degree of rarity and a high degree of interest, rather than a widespread common sentence for introducing the person, is more suitable as a sentence to be presented to the user. This is because a widespread common sentence about a celebrity is already available and the value of such a sentence as information to be provided is low. Also, this is because a sentence with a high degree of interest is not so widespread and the value of the sentence as information to be provided is high. That is, in this case, it is preferable that a sentence with a high sentence score be presented to the user. Thus, the following process from step S66 to S68 is performed in this embodiment.

In step S66, the evaluating unit 123 determines from the evaluation result whether the degree of commonness of the document is high or not.

If it is determined in step S66 that the degree of commonness of the document is high, the process proceeds to step S67.

In step S67, the extracting unit 122 extracts a sentence with a high degree of rarity from the document. That is, the extracting unit 122 extracts a sentence with a high sentence score in the list of sentence scores of the document from the document.

On the other hand, if it is determined in step S66 that the degree of commonness of the document is not high, the process proceeds to step S68.

In step S68, the extracting unit 122 extracts a sentence with a high degree of commonness from the document. That is, the extracting unit 122 extracts a sentence with a low sentence score in the list of sentence scores of the document from the document.

For example, assume that document Y about actress y illustrated in FIG. 8B is extracted in step S63 and that the degree of commonness of document Y is determined to be high in step S65 because actress y is a celebrity. In this case, the determination result obtained in step S66 is YES, and the sentence with the highest sentence score in the list of sentence scores illustrated in FIG. 16, that is, the sentence No. 2, is extracted from the document in step S67. In a case where a plurality of sentences are extracted, the sentences are extracted in descending order of sentence score, that is, the sentences with the N highest sentence scores (N is an integer value of one or more), are extracted. Specifically, in the foregoing example, the sentences No. 2, No. 6, No. 4, . . . with the highest sentence scores are extracted in order.

On the other hand, assume that actress y described in document Y is an unrecognized and uncredited actress and that the degree of commonness of document Y is evaluated as low in step S65. In this case, the determination result obtained in step S66 is NO, and the sentence with the lowest sentence score in the list of sentence scores illustrated in FIG. 16, that is, the sentence No. 1, is extracted from the document in step S68. In a case where a plurality of sentences are extracted, the sentences are extracted in ascending order of sentence score, that is, the sentences with the M lowest sentence scores (M is an integer value of one or more), are extracted. Specifically, in the foregoing example, the sentences No. 1, No. 5, No. 3, . . . with the lowest sentence scores are extracted in order.

In step S69, the communication unit 59 transmits the extracted sentence(s). That is, the communication unit 59 transmits the sentence(s) extracted in step S67 or S68 to the mobile terminal 12.

Accordingly, the sentence extraction process ends.

In the foregoing example, the number of documents searched for in step S62 is one for simple explanation. However, a plurality of documents may be searched for. In that case, the process from step S63 is performed on each of the plurality of documents.

In this way, by extracting a sentence to be presented to a user on the basis of an evaluation result of the degree of commonness of a document, a sentence that is more intriguing to the user is presented. That is, if the degree of commonness of the searched document is high, a sentence with a high degree of rarity, that is, a sentence with a high degree of interest, can be presented to the user. On the other hand, if the degree of commonness of the searched document is low, a sentence with a high degree of commonness can be presented to the user.

Next, a description will be given of a process of displaying information about a predetermined performer who is performing in a television program on the display unit 33 while a user is watching and listening to the television program using the mobile terminal 12.

In this case, it is necessary to display the information about the predetermined performer while putting higher priority on displaying the television program, and thus a display area for sentences is limited. Thus, it is necessary for the server 13 to perform a process of extracting one or more sentences that are more intriguing to the user from a document about the predetermined performer and presenting one or more sentences that satisfy conditions of the display area of the mobile terminal 12 (hereinafter referred to as displayable sentence extraction process). Hereinafter, the displayable sentence extraction process will be described.

Displayable Sentence Extraction Process

Figure 18:
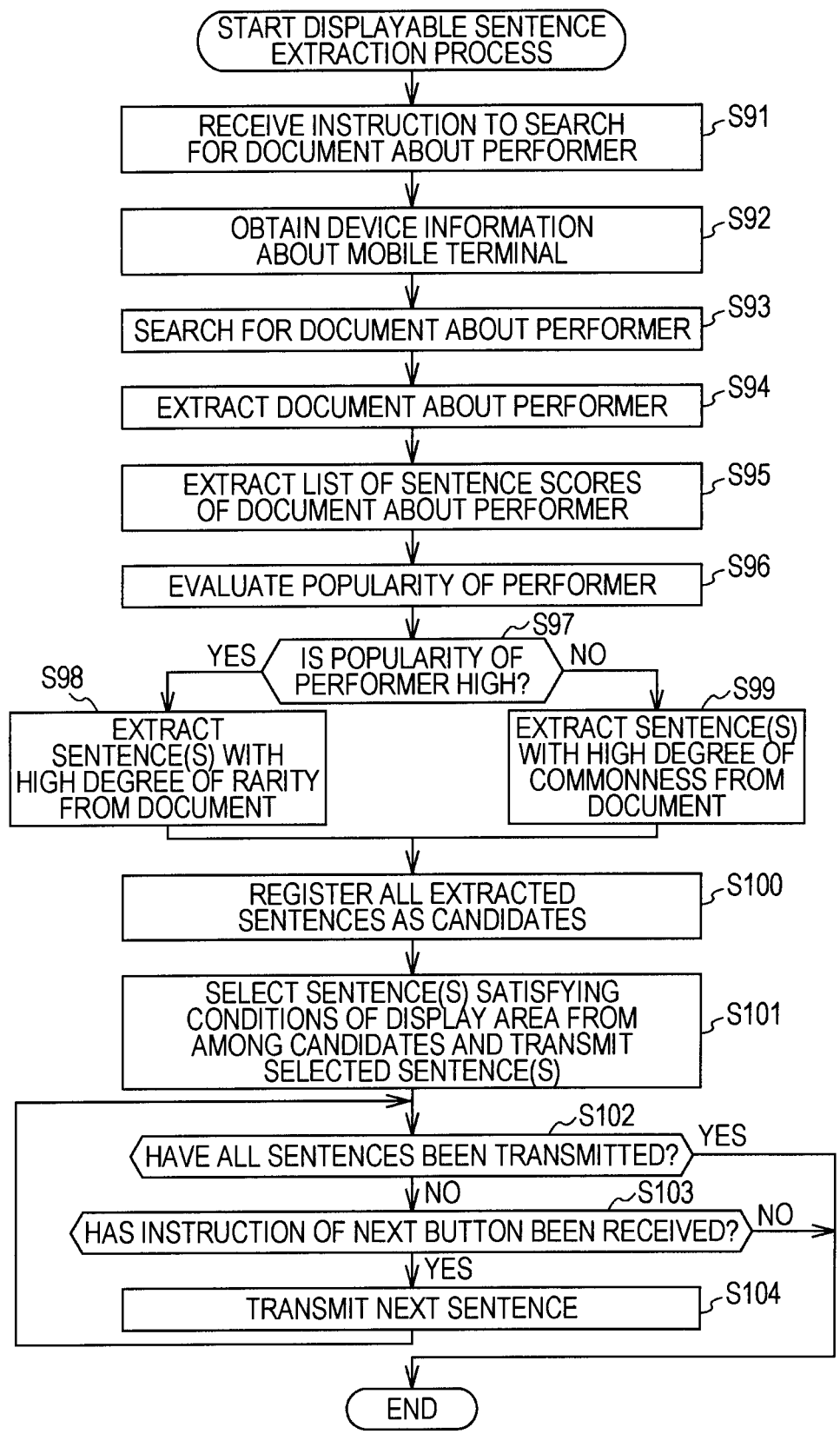
FIG. 18 is a flowchart illustrating an example of a displayable sentence extraction process.

FIG. 18 is a flowchart illustrating an example of a displayable sentence extraction process performed by the sentence-to-be-presented extraction unit 88 of the server 13.

In step S91, the searching unit 121 receives an instruction to search for a document about a performer. That is, the searching unit 121 receives, via the communication unit 59, an instruction to search for a document about a predetermined performer specified from the mobile terminal 12.

In step S92, the communication unit 59 obtains device information about the mobile terminal 12. The device information of the mobile terminal 12 includes conditions of a display area. The conditions of the display area include the number of sentences and the number of characters that can be displayed on the display unit 33 of the mobile terminal 12.

In step S93, the searching unit 121 searches for a document about the performer. That is, the searching unit 121 searches the document group stored in the storage unit 58 for a document about the specified performer on the basis of the instruction.

In step S94, the extracting unit 122 extracts the document about the performer. That is, the extracting unit 122 extracts the document about the performer searched for by the searching unit 121 from the storage unit 58.

In step S95, the extracting unit 122 extracts a list of sentence scores of the document about the performer. That is, the extracting unit 122 extracts a list of sentence scores of the document about the performer extracted in step S94 from the storage unit 58.

In step S96, the evaluating unit 123 evaluates the popularity of the performer. Evaluating the popularity is equivalent to evaluating the name recognition.

As a method for evaluating the popularity of the performer, a method for using popularity ranking in a celebrity evaluation site on the Internet may be employed, for example. According to this method, if the popularity ranking of the predetermined performer is higher than a threshold, it is evaluated that the popularity of the performer is high. The popularity ranking in the evaluation site is obtained at the time of step S1 in FIG. 7 in this embodiment. However, the timing to obtain the popularity ranking is not limited to the example of this embodiment, and any timing before the time of step S96 is acceptable.

In step S97, the evaluating unit 123 determines whether the popularity of the performer is high or not.

If it is determined in step S97 that the popularity of the performer is high, the process proceeds to step S98.

In step S98, the extracting unit 122 extracts a sentence with a high degree of rarity from the document. That is, the extracting unit 122 extracts a sentence with a high sentence score in the list of sentence scores of the document from the document. In a case where a plurality of sentences are extracted, the sentences are extracted in descending order of sentence score. Specifically, in the example illustrated in FIG. 16, the sentences No. 2, No. 6, No. 4, . . . with the highest sentence scores are extracted in order.

On the other hand, if it is determined in step S97 that the popularity of the performer is not high, the process proceeds to step S99.

In step S99, the extracting unit 122 extracts a sentence with a high degree of commonness from the document. That is, the extracting unit 122 extracts a sentence with a low sentence score in the list of sentence scores of the document from the document. In a case where a plurality of sentences are extracted, the sentences are extracted in ascending order of sentence score. Specifically, in the example illustrated in FIG. 16, the sentences No. 1, No. 5, No. 3, . . . with the lowest sentence scores are extracted in order.

In step S100, the storage control unit 124 registers all the extracted sentences as candidates to be displayed. That is, the storage control unit 124 stores, in the storage unit 58, the sentences extracted by the extracting unit 122 as candidates to be displayed on the mobile terminal 12.

In step S101, the selecting unit 125 selects one or more sentences satisfying the conditions of the display area from among the candidate sentences and transmits the selected sentences. That is, the selecting unit 125 transmits the selected sentences to the mobile terminal 12 via the communication unit 59. For example, if the number of sentences that can be displayed under the conditions of the display area is two, two sentences are transmitted even if five sentences are registered as candidates. In this case, the two sentences with the highest or lowest sentence scores are selected from among the candidate sentences and the selected sentences are transmitted. That is, the sentences with the N highest sentence scores (N is an integer value of one or more) or the sentences with the M lowest sentence scores (M is an integer value of one or more) in the sentence scores contained in the list of sentence scores are selected on the basis of the conditions of the display area of the mobile terminal 12, and the selected sentences are transmitted. That is, the value of N or M is determined on the basis of the conditions of the display area of the mobile terminal 12.

Now, a display example of the mobile terminal 12 will be described with reference to FIG. 19.

Figure 19:
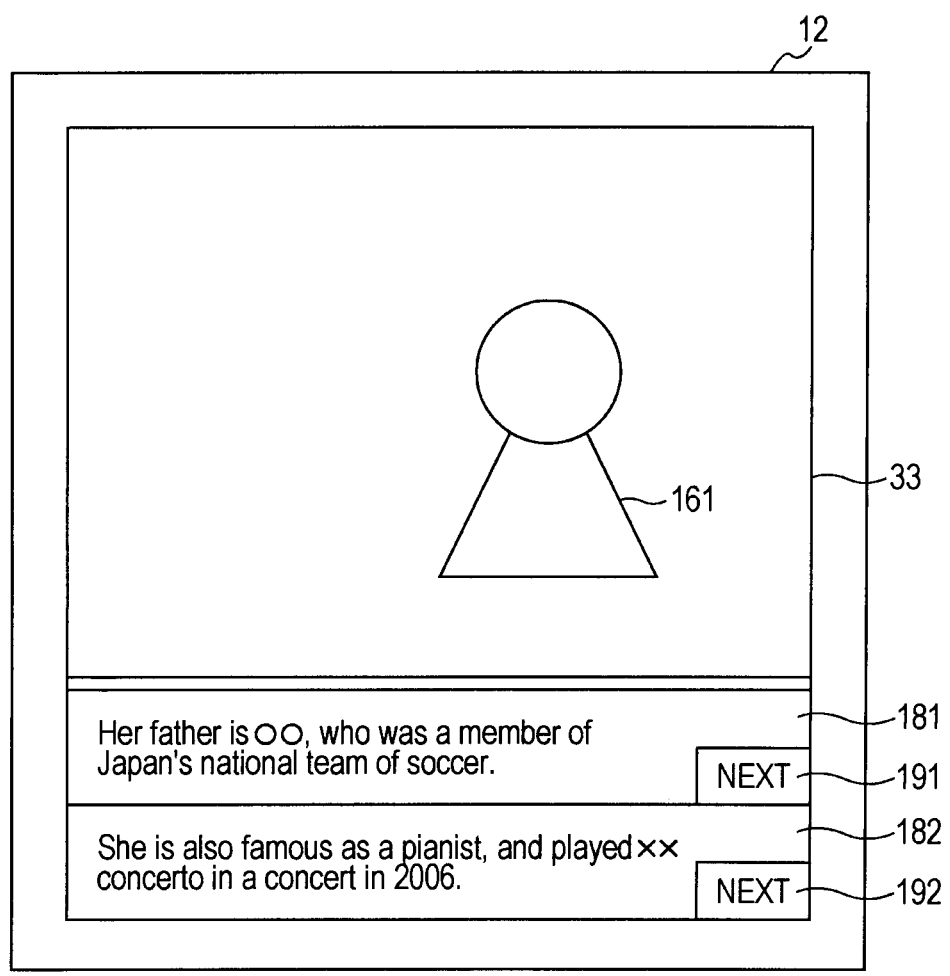
FIG. 19 is a diagram illustrating a display example of the mobile terminal.

FIG. 19 is a diagram illustrating a display example of the mobile terminal 12.

In the example illustrated in FIG. 19, a performer 161 who is performing in a television program is displayed on the display unit 33 of the mobile terminal 12. In areas 181 and 182 under the display unit 33, sentences about the performer 161 are displayed when the user searched for information about the performer 161. That is, in the example illustrated in FIG. 19, the number of sentences that can be displayed under the conditions of the display area of the mobile terminal 12 is two. Icons of "next" buttons 191 and 192 are displayed at the right ends of the areas 181 and 182, respectively. When the user operates the "next" button 191 or 192, the sentence displayed in the area 181 or 182 is switched to the subsequently ranked sentence.

Here, assume that the performer 161 is a very popular actress y. In this case, the sentences that are registered as candidates to be displayed in step S100 are sentences that are extracted in descending order of sentence score from document Y about actress y illustrated in FIG. 16, that is, the sentences No. 2, No. 6, and No. 4. Thus, the sentences that are transmitted in step S101 are the sentences No. 2 and No. 6. The sentence No. 2 is displayed in the area 181 and the sentence No. 6 is displayed in the area 182.

In step S102, the selecting unit 125 determines whether all the sentences have been transmitted or not. That is, the selecting unit 125 determines whether all the sentences registered as candidates to be displayed have been transmitted or not.

If it is determined in step S102 that all the sentences registered as candidates to be displayed have been transmitted, the process ends.

On the other hand, it is determined in step S102 that all the sentences registered as candidates to be displayed have not been transmitted, the process proceeds to step S103.

In step S103, the selecting unit 125 determines whether an instruction of a "next" button has been received or not. That is, the selecting unit 125 determines whether an instruction of a "next" button has been received from the mobile terminal 12 via the communication unit 59.

If it is determined in step S103 that an instruction of a "next" button from the mobile terminal 12 is not received, that is, if the "next" button 191 or 192 is not operated by the user, the process ends.

On the other hand, if it is determined in step S103 that an instruction of a "next" button from the mobile terminal 12 is received, that is, if the "next" button 191 or 192 is operated by the user, the process proceeds to step S104.

In step S104, the selecting unit 125 transmits the next sentence. That is, the selecting unit 125 transmits the next sentence among the candidate sentences that have not yet been transmitted to the mobile terminal 12 via the communication unit 59. For example, if the "next" button 192 is operated by the user, the sentence that is transmitted in step S104 is the sentence No. 4 that has not yet been transmitted among the candidate sentences. Then, in the area 182, the sentence No. 6 is replaced by the sentence No. 4.

Accordingly, the displayable sentence extraction process ends.

In the foregoing example, the number of documents about the performer searched for in step S93 is one for simple explanation. However, a plurality of documents may be searched for. In that case, the process from step S93 is performed on each of the plurality of documents.

The foregoing example of the displayable sentence extraction process is a process of displaying, on the display unit 33, information about a predetermined performer who is performing in a television program displayed on the mobile terminal 12. However, the displayed information is not limited to information about a performer who is performing in a television program, and information about a Web site or movie may be displayed, for example.

In this way, by extracting a sentence to be presented to a user on the basis of an evaluation result of the popularity of a performer, a sentence that is more intriguing to the user is presented on the mobile terminal having a limited display area. That is, if the popularity of a searched performer is high, a sentence with a high degree of rarity, that is, a sentence with a high degree of interest, can be presented to the user. In contrast, if the popularity is low, a sentence with a high degree of commonness can be presented to the user.

The embodiment of the present invention is applicable to apparatuses capable of searching for a sentence, such as an electronic notebook, a personal digital assistant (PDA), a head-mounted display, and a mobile personal computer, as well as a mobile phone and a smart phone.

Application to Program According to Embodiment of Invention

The above-described series of processes can be executed by hardware or software.

In a case where the series of processes are executed by software, a program constituting the software is installed via a network or recording medium into a computer incorporated in dedicated hardware or a multi-purpose personal computer capable of executing various functions by being installed with various programs.

The recording medium includes the removable medium 61 illustrated in FIG. 3 that is separated from the main body of the apparatus, that is distributed to provide a user with a program, and that stores the program, such as a magnetic disk (including a flexible disk), an optical disk (including a compact disk read only memory (CD-ROM), a digital versatile disk (DVD), and a magneto-optical disk (Mini Disk (MD), registered trademark)), or a semiconductor memory, and also includes the ROM 52 storing the program and a hard disk included in the storage unit 58, which are provided to a user while being incorporated in the main body of the apparatus.

In this specification, the individual steps in a process may be performed in time series in accordance with the described order, or may be performed in parallel or individually.

In this specification, the system means an entire configuration including a plurality of apparatuses.

The present application contains subject matter related to that disclosed in Japanese Priority Patent Application JP 2009-247755 filed in the Japan Patent Office on Oct. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a memory; and
a processor, which:
receives instructions from a user to search for a document;
searches for the document in a storage associated with the information processing apparatus;
stores the document in the memory;
classifies the document into a first category and a second category;
extracts a word from the document;
determines a first total number of documents in the first category;
determines a second total number of documents in the second category;
determines a first number of documents as a first count of the documents in the first category that contain the word;
determines a second number of the documents as a second count of the documents in the second category that contain the word;
determines a first ratio of the first total number of documents and the first number of documents;
determines a second ratio of the second total number of documents and the second number of documents;
calculates a word score for the word using a mathematical product of the first ratio and the second ratio, wherein the word score is higher when the word appears less frequently in the category;
extracts a sentence from the document;
calculates a sentence score for the sentence on the basis of the word score; and
displays the sentence on a display, when the sentence score exceeds a threshold.

2. The information processing apparatus according to claim 1, wherein the processor classifies the document by:
obtaining a list of keywords capable of specifying the first category, and
classifying the document into the first category, when the document contains the word that matches any of the keywords.

3. The information processing apparatus according to claim 2, wherein
the processor classifies the document into a first set of categories selected from a plurality of categories, when the document contains words, which match keywords associated with the first set of categories.

4. The information processing apparatus according to claim 1, wherein the sentence is a first sentence among a plurality of sentences, and the processor:
extracts the sentences from the document; and
generates sentence scores for the sentences.

5. The information processing apparatus according to claim 4, wherein the processor displays the sentence by:
identifying first sentences having sentence scores, which exceed a threshold; and
selecting the sentence from the first sentences.

6. The information processing apparatus according to claim 5, wherein the processor selects a first number of the first sentences to display on the basis of conditions of presentation.

7. The information processing apparatus according to claim 5, wherein the processor identifies second sentences having sentence scores, which lie below the threshold.

8. The information processing apparatus according to claim 7, wherein the processor:
determines a degree of commonness of the document;
displays first sentences on a display when the degree of commonness lies below a second threshold; and
displays second sentences on the display when the degree of commonness exceeds the second threshold.

9. The information processing apparatus according to claim 1, wherein:
the sentence score is higher, when the sentence appears less frequently in documents corresponding to the first category; and
the sentence score is lower, when the sentence appears more frequently in documents corresponding to the first category.

10. The information processing apparatus according to claim 1, wherein the word is a first word, the word score is a first word score, and the processor:
extracts a second word from the document;
calculates a second word score for the second word on the basis of an appearance frequency of the second word in the first category; and
calculates the sentence score for the sentence on the basis of the first word score and the second word score.

11. The information processing apparatus according to claim 10, wherein the processor calculates the sentence score as a square root of an average of a sum of squares of the first word score and the second word score.

12. The information processing apparatus according to claim 10, wherein the processor calculates the sentence score as an average of the first word score and the second word score.

13. A computer-implemented information processing method comprising the steps of:
receiving instructions from a user to search for a document;
searching for the document in a storage;
storing the document in a memory;
classifying a document into a first category and a second category;
extracting a word from the document;
determining a first total number of documents in the first category;
determining a second total number of documents in the second category;
determining a first number of documents as a first count of the documents in the first category that contain the word;

determining a second number of documents as a second count of the documents in the second category that contain the word;
calculating, by a processor:
a first ratio of the first total number of documents and the first number of documents;
a second ratio of the second total number of documents and the second number of documents; and
a word score for the word using a mathematical product of the first ratio and the second ratio, wherein the word score is higher, when the word appears less frequently in the category;
extracting a sentence from the document;
calculating a sentence score for the sentence on the basis of the word score; and
displaying the sentence on a display, when the sentence score exceeds a threshold.

14. The computer-implemented information processing of claim 13, wherein classifying a document further includes:
obtaining a list containing a plurality of keywords associated with a plurality of categories, and
classifying the document into first categories selected from the categories, when the document contains words, which match keywords associated with the first categories.

15. The computer-implemented information processing of claim 13, wherein the sentence is a first sentence among a plurality of sentences, and the method further comprises the steps of:
extracting the sentences from the document;
generating a list of sentence scores for the sentences;
identifying high sentence scores as the sentence scores in the list which exceed the threshold;
identifying low sentence scores as the sentence scores in the list which lie below the threshold;
extracting first sentences corresponding to the high sentence scores;
extracting second sentences corresponding to the low scores; and
displaying at least one of the first sentences or the second sentences on a display.

16. The computer-implemented information processing of claim 15, wherein the displaying step includes:
determining a degree of commonness of the document;
displaying first sentences on a display when the degree of commonness lies below a second threshold; and
displaying second sentences on the display when the degree of commonness exceeds the second threshold.

17. The computer-implemented information processing of claim 13, wherein calculating the sentence score includes:
calculating a higher sentence score, when the sentence appears less frequently in documents corresponding to the first category; and
calculating a lower sentence score, when the sentence appears more frequently in documents corresponding to the first category.

18. The computer-implemented information processing of claim 13, wherein the word is a first word, the word score is a first word score, and the method further comprises the steps of:
extracting a second word from the document;
calculating a second word score for the second word; and
calculating the sentence score for the sentence on the basis of the first word score and the second word score.

19. A non-transitory computer-readable medium storing instructions for causing a computer to execute a control process, the process comprising:
receiving instructions from a user to search for a document;
searching for the document in a storage;
storing the document in a memory;
classifying a document into a first category and a second category;
extracting a word from the document;
determining a first total number of documents in the first category;
determining a second total number of documents in the second category;
determining a first number of documents as a first count of the documents in the first category that contain the word;
determining a second number of documents as a second count of the documents in the second category that contain the word;
calculating, by a processor:
a first ratio of the first total number of documents and the first number of documents;
a second ratio of the second total number of documents and the second number of documents; and
a word score for the word using a mathematical product of the first ratio and the second ratio, wherein the word score is higher, when the word appears less frequently in the category;
extracting a sentence from the document;
calculating a sentence score for the sentence on the basis of the word score; and
displaying the sentence on a display, when the sentence score exceeds a threshold.

20. An information processing apparatus comprising:
an input unit configured to receive instructions from a user to search for a document;
a document obtaining unit configured to receive the document in response to the instructions;
a storage unit for storing the document;
a category classifying unit configured to classify a document into a first category and a second category;
a word extracting unit configured to extract a word from the document;
a word score calculating unit configured to calculate a word score for the word by:
determining a first total number of documents in the first category;
determining a second total number of documents in the second category;
determining a first number of documents as a first count of the documents in the first category that contain the word;
determining a second number of documents as a second count of the documents in the second category that contain the word;
determining a first ratio of the first total number of documents and the first number of documents;
determining a second ratio of the second total number of documents and the second number of documents; and
determining a word score using a mathematical product of the first ratio and the second ratio, wherein the word score is higher when the word appears less frequently in the category;
a sentence-for-computation extracting unit configured to extract a sentence from the document;
a sentence score calculating unit configured to calculate a sentence score for the sentence on the basis of the word score; and
a display unit configured to display the sentence, when the sentence score exceeds a threshold.

* * * * *